(12) United States Patent
Nagana (10) Patent No.: US 7,636,359 B2
(45) Date of Patent: Dec. 22, 2009

(54) RECEIVED PACKET PROCESSING METHOD AND RECEIVED PACKET PROCESSING APPARATUS FOR A PACKET HAVING A SEQUENCE NUMBER AND A TIME STAMP

(75) Inventor: Tsugumichi Nagana, Tokyo (JP)

(73) Assignee: NEC Corporation, Tokyo (JP)

( * ) Notice: Subject to any disclaimer, the term of this patent is extended or adjusted under 35 U.S.C. 154(b) by 309 days.

(21) Appl. No.: 11/841,019

(22) Filed: Aug. 20, 2007

(65) Prior Publication Data
US 2008/0043743 A1 Feb. 21, 2008

(30) Foreign Application Priority Data
Aug. 18, 2006 (JP) .............................. 2006-223188

(51) Int. Cl.
H04L 12/28 (2006.01)
(52) U.S. Cl. ...................................................... 370/394
(58) Field of Classification Search ................. 370/252, 370/352–356, 389, 392, 394; 709/227, 228, 709/230–232
See application file for complete search history.

(56) References Cited
U.S. PATENT DOCUMENTS
7,313,141 B2 * 12/2007 Kan et al. .................... 370/394

2007/0070916 A1 * 3/2007 Lehane et al. ............... 370/252

FOREIGN PATENT DOCUMENTS
JP 2000307637 2/2000
JP 2000228676 5/2000

* cited by examiner

Primary Examiner—Pankaj Kumar
Assistant Examiner—Gautam Sharma
(74) Attorney, Agent, or Firm—Young & Thompson (57) ABSTRACT

Packets each including a sequence number and a time stamp are sequentially received, and a linear expression representing a correspondence between the sequence number and the time stamp is calculated based on the received packets. If a packet including a sequence number discontinuous to sequence numbers of the previously received packets is received, it is determined whether the currently received packet satisfies the linear expression by checking the sequence number and the time stamp of the currently received packet. If the currently received packet including the sequence number discontinuous to the sequence numbers of the previously received packets satisfies the linear expression, an output order is changed according to the sequence numbers of the packets. If the currently received packet including the sequence number discontinuous to the sequence numbers of the previously received packets does not satisfy the linear expression, the currently received packet is output.

4 Claims, 10 Drawing Sheets

RECEIVED PACKET PROCESSING METHOD AND RECEIVED PACKET PROCESSING APPARATUS FOR A PACKET HAVING A SEQUENCE NUMBER AND A TIME STAMP

This application is based upon and claims the benefit of priority from Japanese patent application No. 2006-223188, filed on Aug. 18, 2006, the disclosure of which is incorporated herein in its entirety by reference.

BACKGROUND OF THE INVENTION

1. Field of the Invention

The present invention relates to a received packet processing method and a received packet processing method for processing a packet received from a transmitter via an IP (Internet Protocol) network.

2. Description of the Related Art

Recently, broadcasting is performed by transmitting radio waves in a VHF band or UHF band from a broadcasting station and receiving the radio waves at a receiver. Namely, broadcasting usually and generally means wireless broadcasting.

However, because of recent development of IP network technology, wired broadcasting has been able to be performed using an IP network. According to the IP network technology, an RTP (Real-time Transport Protocol) packet according to RFC3550 is inserted into a payload of an IP packet and image data is inserted into the RTP packet. In many cases, the image data is compressed image data according to MPEG (Moving Picture Experts Group) or the like.

There are related documents as follows: JP-A-2000-307637 and JP-A-2000-228676

If the receiver is to receive broadcasting data on a certain channel via the IP network, the broadcasting data on the channel is not always transmitted from one broadcasting station. For example, a local station broadcasts the broadcasting data received from a Tokyo station in one time zone and broadcast the broadcasting data created by the local station in another time zone.

In one broadcasting station, it is possible to create a time stamp using a date distributed from one common time stamp clock and insert the created time stamp into a header of an RTP packet. Accordingly, if a plurality of programs created in one broadcasting station is combined, it is possible to ensure continuity of time stamps among the programs. It is also possible to ensure continuity of sequence numbers inserted into headers of respective RTP packets among the programs.

However, as stated, if a plurality of broadcasting data transmitted from broadcasting stations different according to time zones is to be combined, it is disadvantageously difficult to ensure continuity of time stamps and continuity of sequence numbers.

Under these circumstances, if the related technique is applied to a receiver, a packet just after changeover from broadcasting data in one time zone to that in a next time zone is abandoned for the following reason. If sequence numbers are discontinuous before and after the changeover, a packet the sequence number of which is not continuous to that of a previously received packet is regarded as an unauthorized packet.

To avoid the disadvantage, if the packet the sequence number of which is not continuous to that of the previously received packet is regarded as an authorized packet and transferred to a higher layer as it is, the packet right after the changeover from the broadcasting program in one time zone to that in the next time zone can be certainly relieved.

In the meantime, according to a method of transmitting IP packets on the IP network, it is not guaranteed that an order of IP packets arriving at a receiver is the same as that for transmitting the IP packets from a transmitter. Instead, an IP packet transmitted later from the transmitter often arrives at the receiver at earlier time than that transmitted earlier from the transmitter. In that case, the continuity of sequence numbers inserted into the headers of the RTP packets is destroyed, with the result that rearrangement of sequence numbers occurs.

If the rearrangement of sequence numbers resulting from characteristics of the IP network occurs to the same broadcasting program, the packet the sequence number of which is not continuous to that of the previously received packet is regarded as an authorized packet, and the packet is transferred to the higher layer as it is, then the receiver is unable to correctly receive the broadcasting program. In this case, it is disadvantageously necessary to rearrange the order of packets so as to recover the continuity of sequence numbers.

SUMMARY OF THE INVENTION

It is, therefore, an object of the present invention to provide a received packet processing method and a received packet processing apparatus capable of returning an order of packets to a correct order by sorting the packets if the order of packets transmitted from the same transmitter is changed due to characteristics of an IP network or the like, and capable of using packets right after changeover from one transmitter to another transmitter serving as a source for reproduction of broadcasting data on a certain channel without abandoning the packets.

According to a first aspect of the present invention, there is provided a received packet processing method comprising: a packet receiving step of sequentially receiving packets each including a sequence number and a time stamp; a linear expression calculating step of calculating a linear expression representing a correspondence between the sequence number and the time stamp based on the packets received at the packet receiving step; a determining step of, if a packet including a sequence number discontinuous to sequence numbers of the previously received packets is received, determining whether or not the currently received packet satisfies the correspondence represented by the linear expression by checking the sequence number and the time stamp of the currently received packet; a rearranging and outputting step of, if it is determined at the determining step that the currently received packet including the sequence number discontinuous to the sequence numbers of the previously received packets satisfies the correspondence represented by the linear expression, changing an output order of the currently received packet according to the sequence number of the currently received packet; and a continuously outputting step of, if it is determined at the determining unit that the currently received packet including the sequence number discontinuous to the sequence numbers of the previously received packets does not satisfy the correspondence represented by the linear expression, outputting the currently received packet without abandoning the packet.

In the received packet processing method according to the first aspect of the present invention, after the continuously outputting step is executed, the packet receiving step and the linear expression calculating step may be executed, whereby a new linear expression representing a correspondence between the sequence number and time stamp may be obtained, and the determining step may be executed based on the correspondence represented by the new linear expression.

According to the present invention, it is possible to return an order of packets to a correct order by sorting the packets if the order of packets transmitted from the same transmitter is changed due to characteristics of an IP network or the like. It is also possible to use packets right after changeover from one transmitter to another transmitter serving as a source for reproduction of broadcasting data on a certain channel without abandoning the packets.

DESCRIPTION OF THE PREFERRED EMBODIMENTS

An embodiment of the present invention will be described hereinafter in detail with reference to the accompanying drawings.

Figure 1:
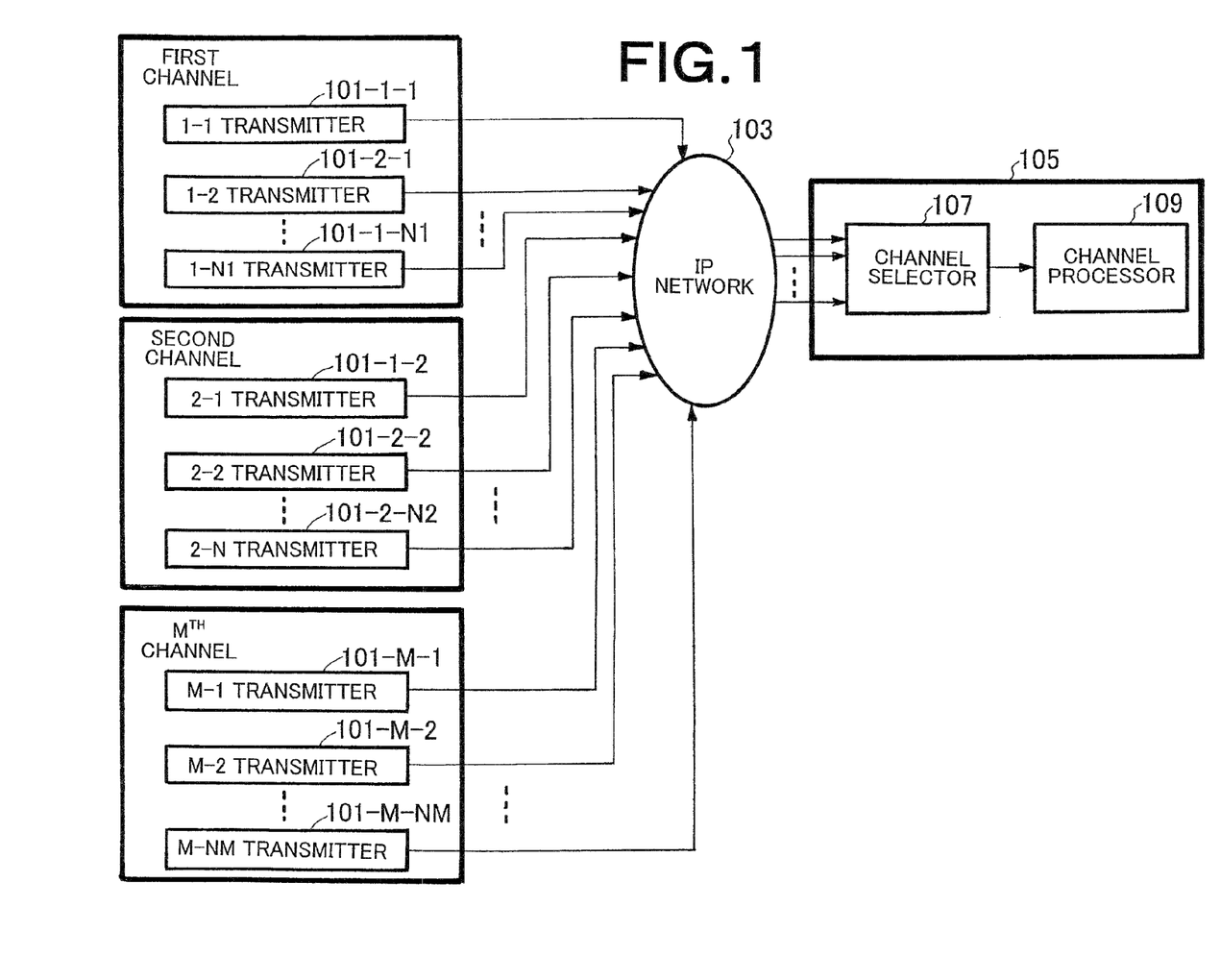
FIG. 1 is a block diagram showing a configuration of an overall broadcasting system according to an embodiment of the present invention.

FIG. 1 is a block diagram showing a configuration of an overall broadcasting system according to the embodiment of the present invention.

Referring to FIG. 1, transmitters broadcasting programs on a first channel are a 1-1 transmitter 101-1-1, a 1-2 transmitter 101-1-2, . . . , and a 1-N1 transmitter 101-1-N1. The transmitters 101-1-1 to 101-1-N1 are located, for example, in a Tokyo headquarters, Tokyo branches, and Nagoya branches, respectively. An IP network 103 includes a multiplexing unit that combines a plurality of broadcasting data transmitted from the transmitters 101-1-1 to 101-1-N1. For example, the multiplexing unit outputs broadcasting data transmitted from the 1-1 transmitter 101-1-1 in one time zone, outputs that transmitted from the 1-2 transmitter 101-1-2 in the next time zone, and outputs that transmitted from the 1-N1 transmitter 101-1-N1 in a subsequent time zone. Namely, the multiplexing unit creates broadcasting data on one channel by combining the broadcasting data transmitted from some of the transmitters 101-1-1 to 101-1-N1.

Transmitters broadcasting data on second to $M^{th}$ channels are configured similarly to those broadcasting data on the first channel and operates similarly.

Namely, transmitters broadcasting data on the second channel are a 2-1 transmitter 101-2-1, a 2-2 transmitter 101-2-2, . . . , and a 2-N1 transmitter 101-2-N2. Transmitters broadcasting data on the $M^{th}$ channel are a M-1 transmitter 101-M-1, a M-2 transmitter 101-M-2, . . . , and a M-N1 transmitter 101-M-NM. Since operations performed by these transmitters and those performed by multiplexing units for the respective channels are similar to those for the first channel, they will not be described herein.

The channel selector 107 selects any one of the channels. If the channel selector 107 selects, for example, the first channel, broadcasting data transmitted from the 1-1 transmitter 101-1-1, that transmitted from the 1-2 transmitter 101-1-2, . . . , and that transmitted from the 1-N1 transmitter 101-1-N1, which data have been time-division-multiplexed by the multiplexing unit of the IP network 103, are supplied to the channel processor 109.

Figure 2:
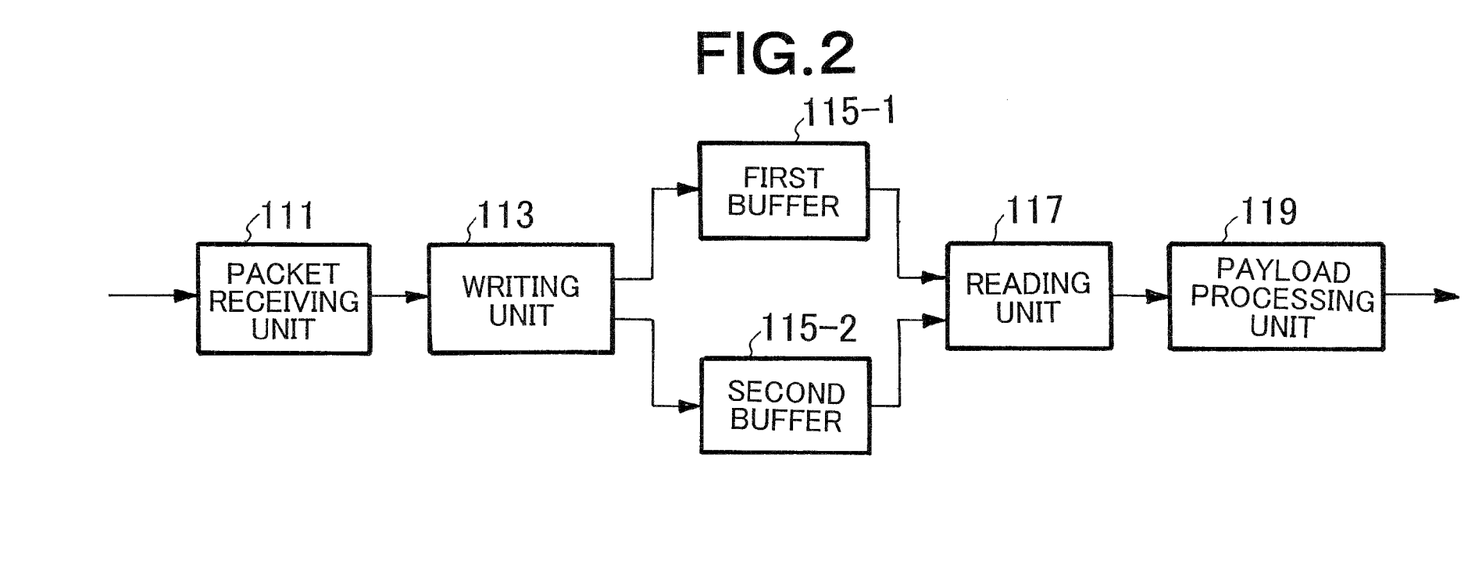
FIG. 2 is a block diagram showing a configuration of a channel processor shown in FIG. 1.

FIG. 2 is a block diagram showing a configuration of the channel processor 109 shown in FIG. 1. The channel processor 109 is constituted by hardware, software or a combination of hardware and software. The "channel processor 109 is constituted by software" means that the channel processor 109 is constituted by causing a computer to read and execute a program for allowing the computer to function as the channel processor 109 or that the channel processor 109 is constituted by causing a computer to read and execute a program describing steps of a method performed by the channel processor 109.

A packet receiving unit 111 receives broadcast IP packets and extracts RTP packets from the respective IP packets.

A writing unit 113 determines to which buffer each of the RTP packets input from the packet receiving unit 111 is to be written, a first buffer 115-1 or a second buffer 115-2, based on a sequence number and a time stamp described in an RTP header of each of the RTP packets. The writing unit 113 writes each RTP packet to the first buffer 115-1 or the second buffer 115-2 based on the determination. As a result of the determination, the RTP packets transmitted from the same transmitter are written to the same buffer.

Each of the first buffer 115-1 and the second buffer 115-2 stores therein RTP packets transmitted from the same transmitter. For example, if broadcasting data on the first channel is transmitted from the 1-1 transmitter 101-1-1 in a certain time zone, and broadcasting data on the first channel is transmitted from the 1-2 transmitter 101-1-2 in a next time zone, then RTP packets extracted from IP packets of the broadcasting data transmitted from the 1-1 transmitter 101-1-1 are written to the first buffer 115-1 and those from the 1-2 transmitter 101-1-2 are written to the second buffer 115-2.

A reading unit 117 continuously reads the RTP packets, which have been extracted from IP packets of the broadcasting data transmitted from a certain transmitter, from the first buffer 115-1, continuously reads the RTP packets, which have been extracted from IP packets of the broadcasting data transmitted from another certain transmitter, from the second buffer 115-2, and temporally combines the RTP packets.

A payload processing unit 119 processes payload of the RTP packets input from the reading unit 117 and outputs images.

Figure 3:
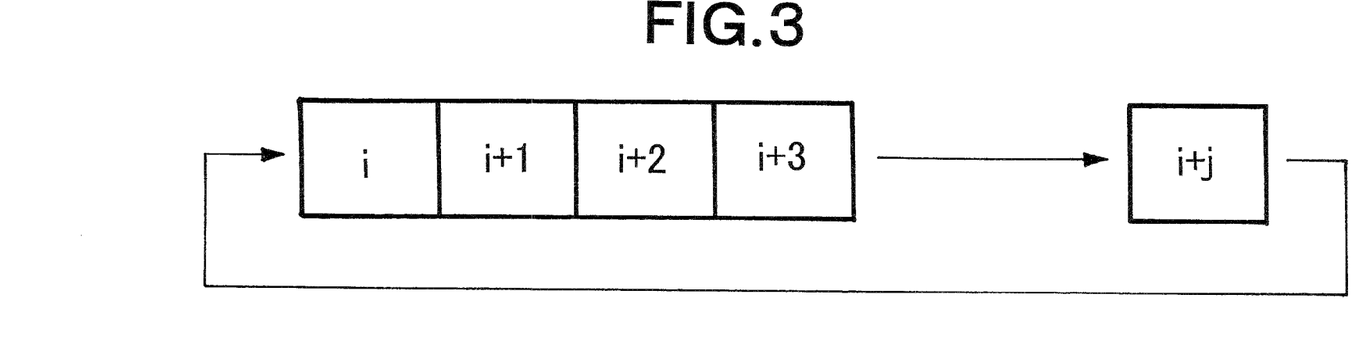
FIG. 3 is a block diagram showing a configuration of each of buffers shown in FIG. 2.

Each of the first buffer 115-1 and the second buffer 115-2 shown in FIG. 2 has a ring buffer structure as shown in FIG. 3. In the example of FIG. 3, a ring buffer includes j entries. An entry subsequent to an entry at an address (i+j−1) is an entry at an address i. Each entry includes an area to which an RTP packet is written and an area to which an end mark is written. It is assumed that j is a value sufficiently large to be able to absorb change of reception order.

Received RTP packets are written to entries at addresses according to sequence numbers of the respective RTP packets. Accordingly, if the reception order is not changed, the received RTP packets are written to the respective entries in sequence in ascending order of addresses from smaller to larger addresses. On the other hand, if the reception order is changed, the received RTP packets are written to entries at discontinuous addresses, respectively. However, in a state in which the RTP packets have been written to the buffer, the sequence numbers of the RTP packets are set in order to correspond to the order of addresses.

An end mark indicates that an RTP packet in a certain entry is the last RTP packet transmitted from a certain transmitter.

Figure 4:
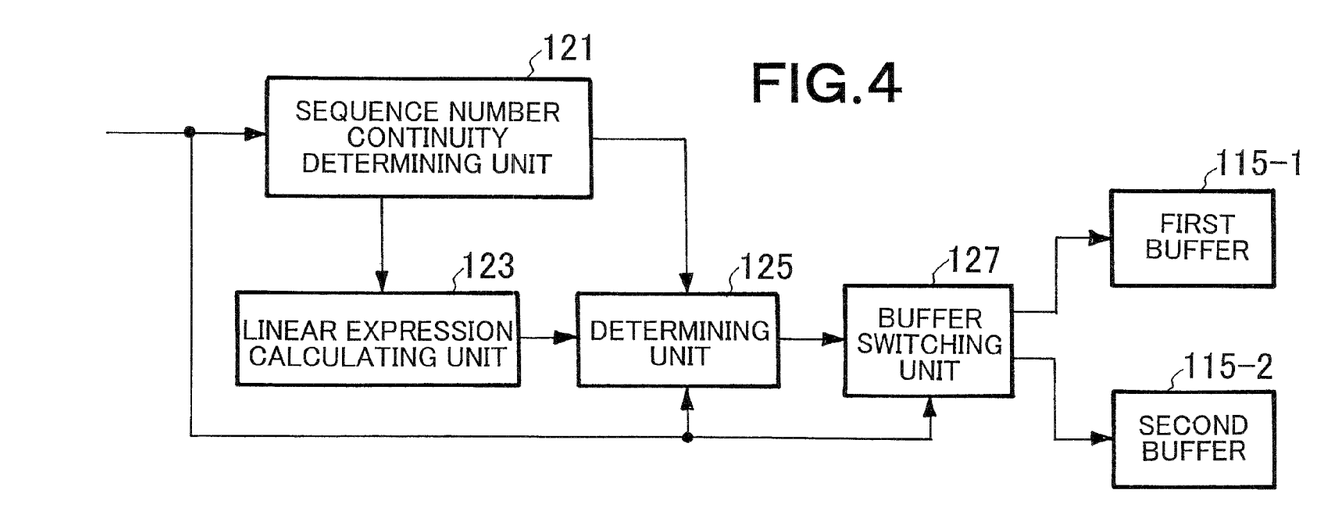
FIG. 4 is a block diagram showing a configuration of a writing unit shown in FIG. 2.

FIG. 4 is a block diagram showing a configuration of the writing unit 113 shown in FIG. 2.

A sequence number continuity determining unit 121 determines whether the sequence numbers described in the headers of the received RTP packets are continuous. Namely, if the sequence number described in the header of the RTP packet received at certain time is greater by 1 than that described in the header of the RTP packet received at time before the certain time, the sequence number continuity determining unit 121 determines that the sequence numbers are continuous. Otherwise, the sequence number continuity determining unit 121 determines that the sequence numbers are not continuous.

A linear expression calculating unit 123 calculates two coefficients a and b of the following linear expression representing the correspondence between the sequence number and the time stamp described in each of the RTP packets based on two or more RTP packets determined to be continuous by the sequence number continuity determining unit 121.

$$TS = a \times SQ + b$$

In the linear expression, TS denotes a time stamp and SQ denotes a sequence number.

A determining unit 125 determines whether the RTP packet received at the certain time is transmitted from a transmitter that transmitted the RTP packet received at time before the certain time or a transmitter different from the former transmitter, based on a determination result of the sequence number continuity determining unit 121 and the two coefficients of the linear expression calculated by the linear expression calculating unit 123.

A buffer switching unit 127 writes the first received RTP packet to the first buffer 115-1, and writes the subsequently received RTP packets to the same first buffer 115-1 as long as the determining unit 125 determines that the subsequently received RTP packets are transmitted from the same transmitter as that transmitting the first received buffer. If the determining unit 125 determines that the subsequently received RTP packets are transmitted from another transmitter, the buffer switching unit 127 writes the subsequently received RTP packets to the other, i.e., second buffer 115-2. Thereafter, as long as the determining unit 125 determines that the RTP packets received subsequent to the subsequently received RTP packets are transmitted from another transmitter, the buffer switching unit 127 writes the RTP packets to the second buffer 115-2. Namely, the buffer switching unit 127 changes over buffers to which RTP packets are written whenever one transmitter from which the received RTP packets are transmitted is changed to another transmitter. Moreover, the RTP packets are written to the entries at addresses according to the sequence numbers of the respective RTP packets. Due to this, even if the order of RTP packets transmitted from the same broadcasting station is changed in the IP network 103, it is possible to return the changed order to a correct order by adopting the above-stated writing method. Further, the buffer switching unit 127 writes an end mark as well as the last RTP packet to the last entry of the buffer just before the buffer is changed over to another buffer.

Figure 5:
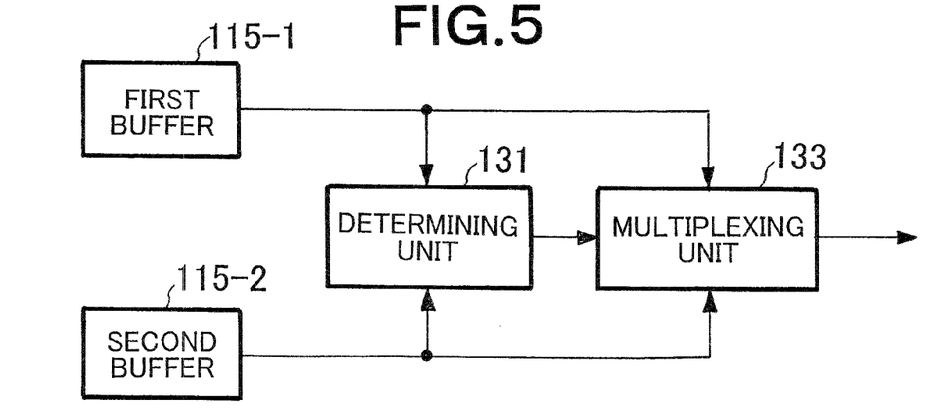
FIG. 5 is a block diagram showing a configuration of a reading unit shown in FIG. 2.

FIG. 5 is a block diagram showing a configuration of the reading unit 117 shown in FIG. 2.

First, a determining unit 131 reads the RTP packets from the first buffer 115-1. The determining unit 131 sequentially reads the RTP packets from the first buffer 115-1 according to the addresses of the respective entries until reading the end mark from the first buffer 115-1.

When reading the end mark from the first buffer 115-1, the determining unit 131 starts reading the RTP packets from the second buffer 115-2. The determining unit 131 sequentially reads the RTP packets from the second buffer 115-2 according to the addresses of the respective entries until reading the end mark from the second buffer 115-2.

When reading the end mark from the second buffer 115-2, the determining unit 131 reads the RTP packets from the first buffer 115-1 again and repeats the above-stated operation.

A multiplexing unit 131 time-division-multiplexes the RTP packets read from the first buffer 115-1 with those read from the second buffer 115-2, and outputs continuous RTP packets on one channel as a multiplexing result.

Operation performed by the channel processor 109 shown in FIG. 1 will be described in more detail.

Figure 6:
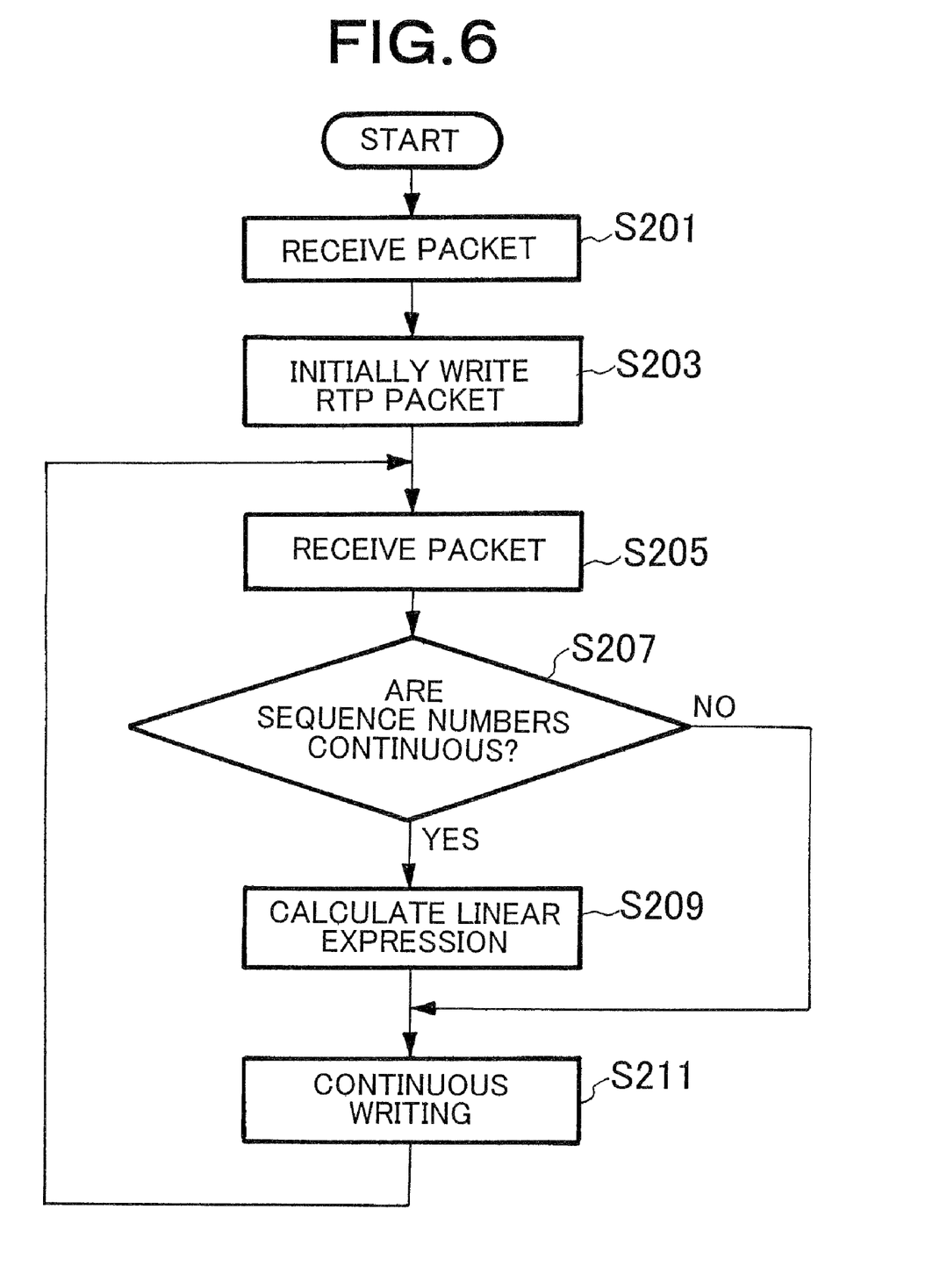
FIG. 6 is a flowchart for explaining operations performed by a packet receiving unit and the writing unit shown in FIG. 2.

FIG. 6 is a flowchart for explaining operations performed by the packet receiving unit 111 and the writing unit 113 shown in FIG. 2.

The packet receiving unit 111 receives a first IP packet (step S201). Next, the writing unit 113 writes an RTP packet extracted from the IP packet received at the step S201 to the first buffer 115-1 (step S203).

The channel processor 109 repeats operations from a step S205 to a step S211.

At the step S205, the packet receiving unit 111 receives a next IP packet.

At the step S207, if the processing goes to the step S205 from the step S203, the sequence number continuity determining unit 121 determines whether the sequence number described in the header of an RTP packet extracted from the IP packet received at the current step S205 is continuous to that described in the header of the RTP packet extracted from the IP packet received at the step S201 or the header of an RTP packet extracted from the IP packet received at the previous step S205. If the processing goes to the step S205 from the step S211, the sequence number continuity determining unit 121 determines whether the sequence number described in the header of the RTP packet extracted from the IP packet received at the current step S205 is continuous to that described in the header of the RTP packet extracted from the IP packet received at the previous step S205. To "determine whether or not RTP packets are continuous" means to determine whether the sequence number described in the header of the RTP packet extracted from the currently received IP packet (hereinafter, "currently received RTP packet", the same shall apply hereafter) is greater by 1 than that described in the heard of the previously received RTP packet.

If the sequence number continuity determining unit 121 determines that the sequence numbers of the RTP packets are continuous (Yes, step S207) and the processing goes to the step S205 from the step S203, the linear expression calculating unit 123 calculates the coefficients of the linear expression representing the relationship between the sequence number and the time stamp based on the sequence number and the time stamp described in the header of the RTP packet received at the step S201 and those described in the header of the RTP packet received at the step S205. Alternatively, if the sequence number continuity determining unit 121 determines that the sequence numbers of the RTP packets are continuous (Yes, S207) and the processing goes to the step S205 from the step S211, the linear expression calculating unit 123 calculates the coefficients of the linear expression representing the relationship between the sequence number and the time stamp based on the sequence number and the time stamp described in the header of the RTP packet received at the previous step S205 and those described in the header of the RTP packet received at the current step S205 (step S209).

Figure 10:
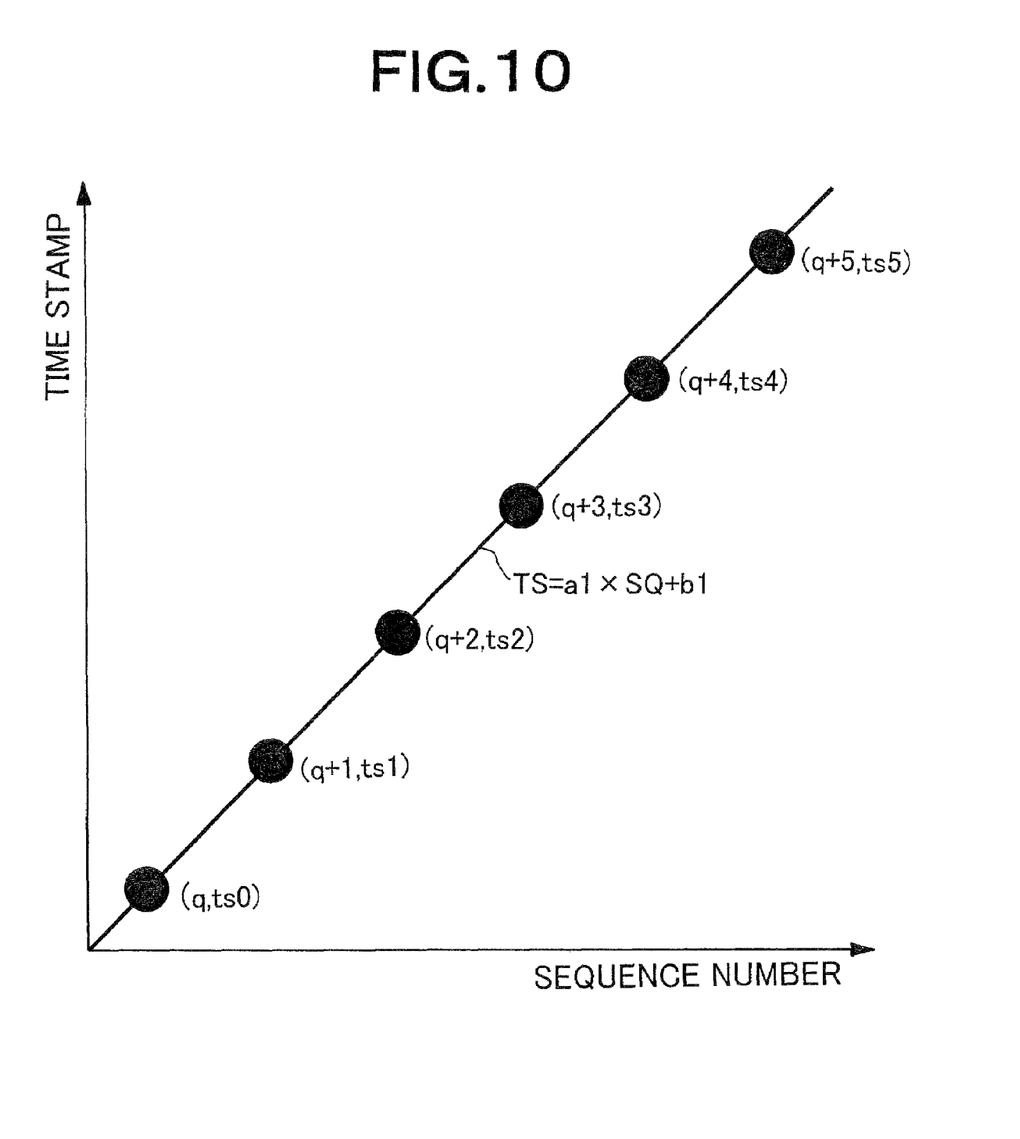
FIG. 10 is a chart showing the relationship between sequence number and time stamp in case of FIG. 9.

Referring to, for example, FIG. 10, coefficients a1 and b1 of the following linear expression are expressed by the following equations, respectively.

$$TS = a1 \times SQ + b1$$

$$a1 = (ts1 - ts0)/((q+1) - q) = ts1 - ts0$$

$$b1 = ts1 - a1 \times (q+1) = ts1 - (ts1 - ts0) \times (q+1).$$

Here, an example of calculating the coefficients a1 and b1 only from two samples is shown. Alternatively, the two coefficients a1 and b1 may be calculated from three or more samples using a least squares method or the like. In this alternative, samples corresponding to the same transmitter and already written to the buffer 115-1 or 115-2 may be referred to.

If NO at the step S207, the processing goes to the step S211 from the step S207 similarly to the instance of Yes at the step S207 in which instance the processing goes to the step S211 from the step S209. The step S211 is a continuously writing step. The step S211 will be described in detail with reference to FIG. 7.

Figure 7:
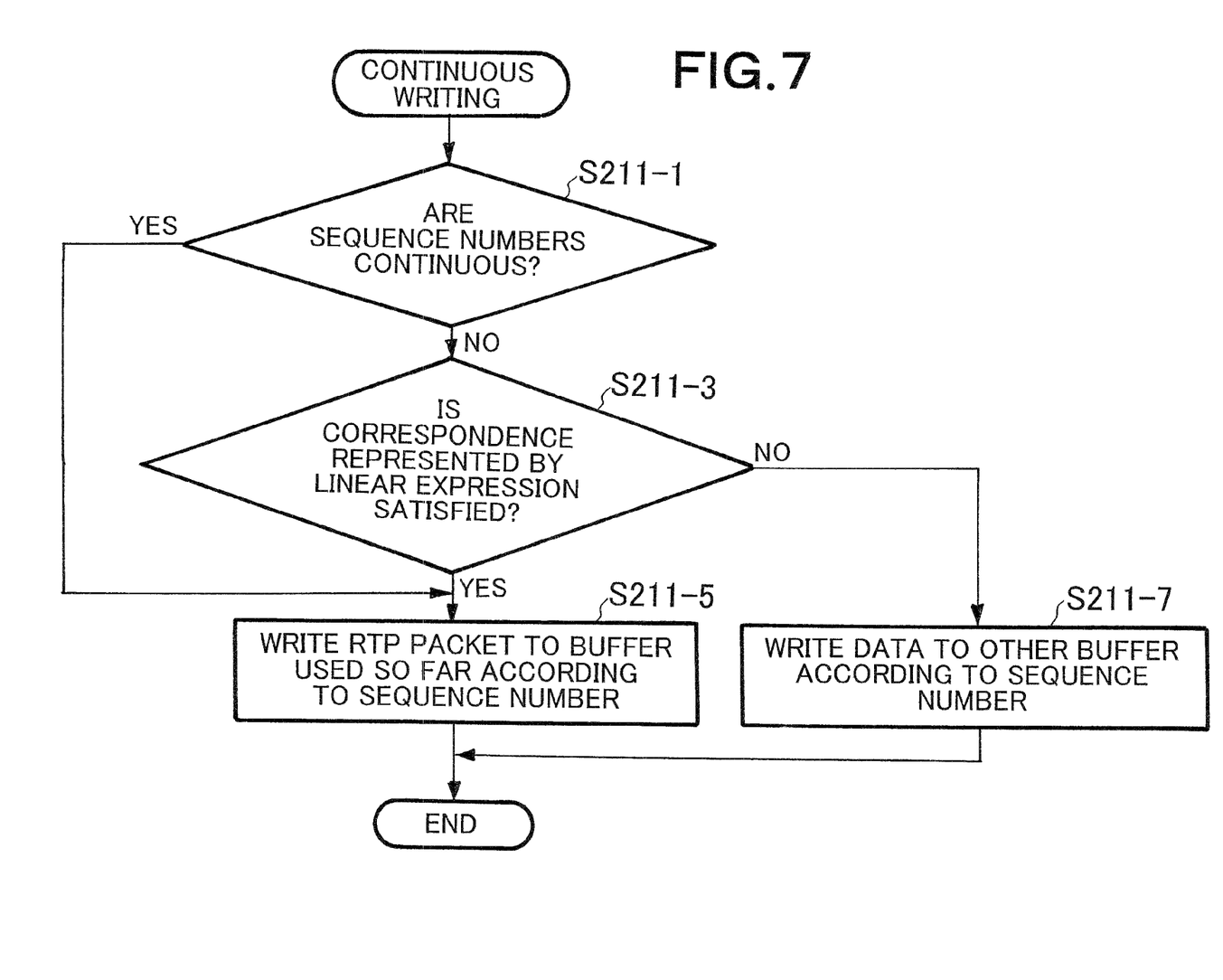
FIG. 7 is a flowchart showing details of a continuous writing step shown in FIG. 6.

First, similarly to the step S207, it is determined whether the sequence number described in the header of the currently received RTP packet is continuous to that described in the header of the previously received RTP packet (step S211-1).

If it is determined that they are continuous (YES, step S211-1), the writing unit 113 writes the RTP packet received at the step S205 to the buffer to which the RTP packets have been written just before the RTP packet received at the step S205 (step S211-5). Generally, the addresses of the entries to which RTP packets are written are addresses according to the order of sequence numbers. In this case, since the sequence numbers are continuous, the write address of the entry to which the currently received RTP packet is written is a next address to the address of the entry to which the previously received RTP packet is written.

If it is determined that they are not continuous (NO, step S211-1), it is determined whether a pair of the sequence number and the time stamp described in the header of the RTP packet received at the step S205 is included in a line represented by the linear expression calculated at the step S209, that is, whether the RTP packet received at the current step S205 satisfies the relationship represented by the present linear expression (step S211-3). Specifically, the sequence number of the RTP packet received at the step S205 is multiplied by the coefficient a1, the coefficient b1 is added to a multiplication result, and it is determined whether a resultant value is equal to the time stamp. In this case, an allowable error may be appropriately set in view of a quantization error and a fluctuation of the time stamp.

If the RTP packet received at the current step S205 satisfies the relationship represented by the present linear expression (YES, step S211-3), the writing unit 113 writes the RTP packet received at the current step S205 to the buffer to which the RTP packets have been written just before the RTP packet received at the current step S205 (step S211-5). Generally, the addresses of the entries to which RTP packets are written are addresses according to the order of sequence numbers. In this case, since the sequence numbers are not continuous, the write address of the entry to which the currently received RTP packet is written is not the next address to the address of the entry to which the previously received RTP packet is written. Nevertheless, the linear relationship between the write address and the sequence number is maintained.

If the RTP packet received at the current step S205 does not satisfy the relationship represented by the present linear expression (NO, step S211-3), the writing unit 113 writes the RTP packet received at the current step S205 to the buffer other than the buffer to which the RTP packets have been written just before the RTP packet received at the current step S205 (step S211-7). The write address of the entry to which the currently received RTP packet is written is the address of a leading entry of the other buffer.

Figure 8:
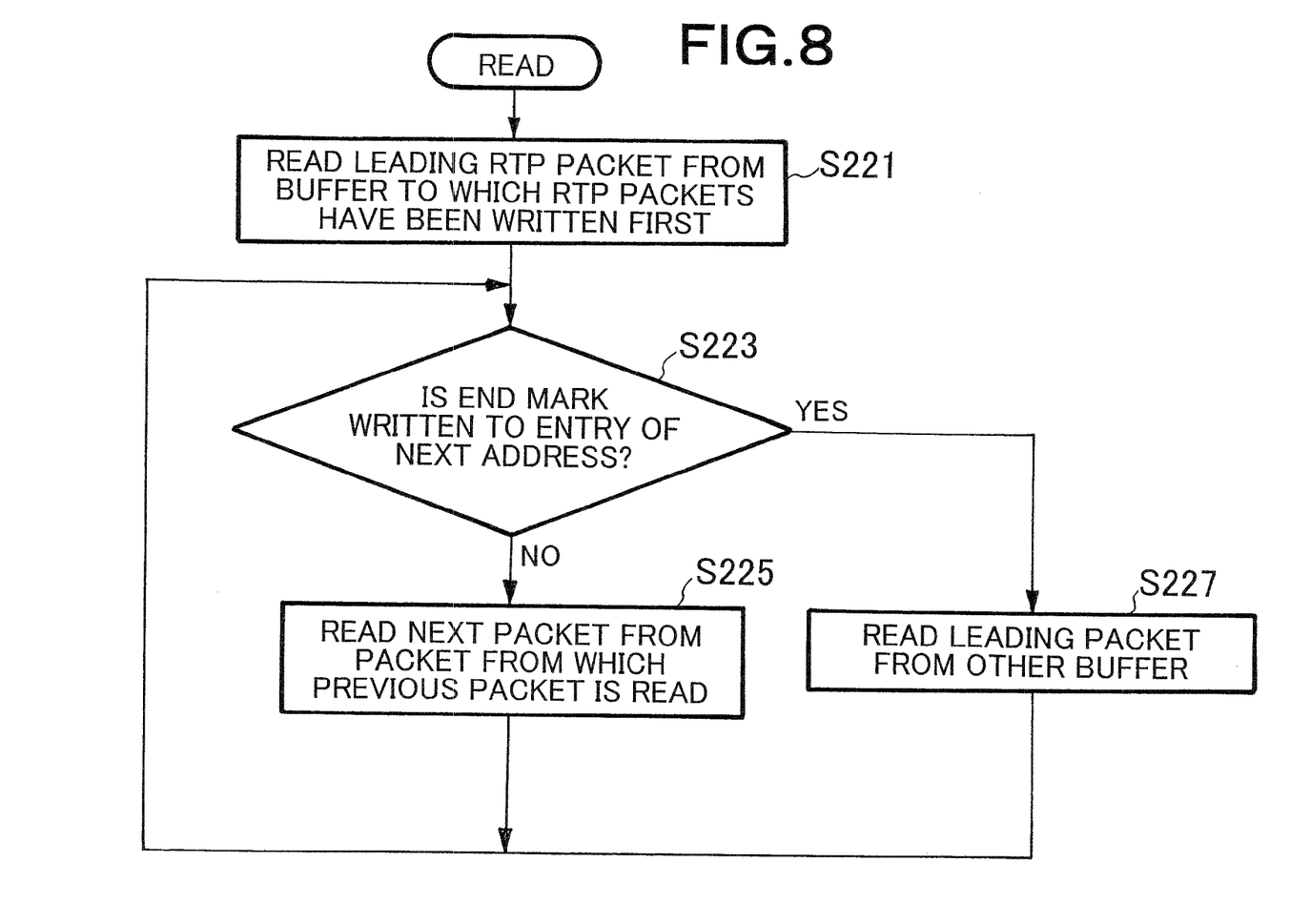
FIG. 8 is a flowchart showing operation performed by the reading unit shown in FIG. 2.

Operation performed by the reading unit 117 shown in FIG. 2 will next be described with reference to FIG. 8.

First, the reading unit 117 reads a leading RTP packet from the buffer to which RTP packets have been written first (step S221).

Next, the reading unit 117 repeats steps 223 and 225 or 227.

At the step S223, it is determined whether an end mark is written to the entry of the next address to the address of the entry of the buffer from which entry the previous RTP packet is read.

If the end mark is not written (NO, step S223), this means that RTP packets from the same transmitter are written to the same buffer. Due to this, the reading unit 117 reads an RTP packet from the entry at the next address of the buffer from which buffer the previous RTP packet is read (step S225).

If the end mark is written (YES, step S223), this means that the RTP packets from the same transmitter are not already written to the same buffer. Due to this, the reading unit 117 reads an RTP packet from the entry at a leading address of the buffer other than the buffer from which the previous RTP packet has been read (step S225).

Advantages of the embodiment of the present invention will be described while referring to specific examples.

Figure 9:
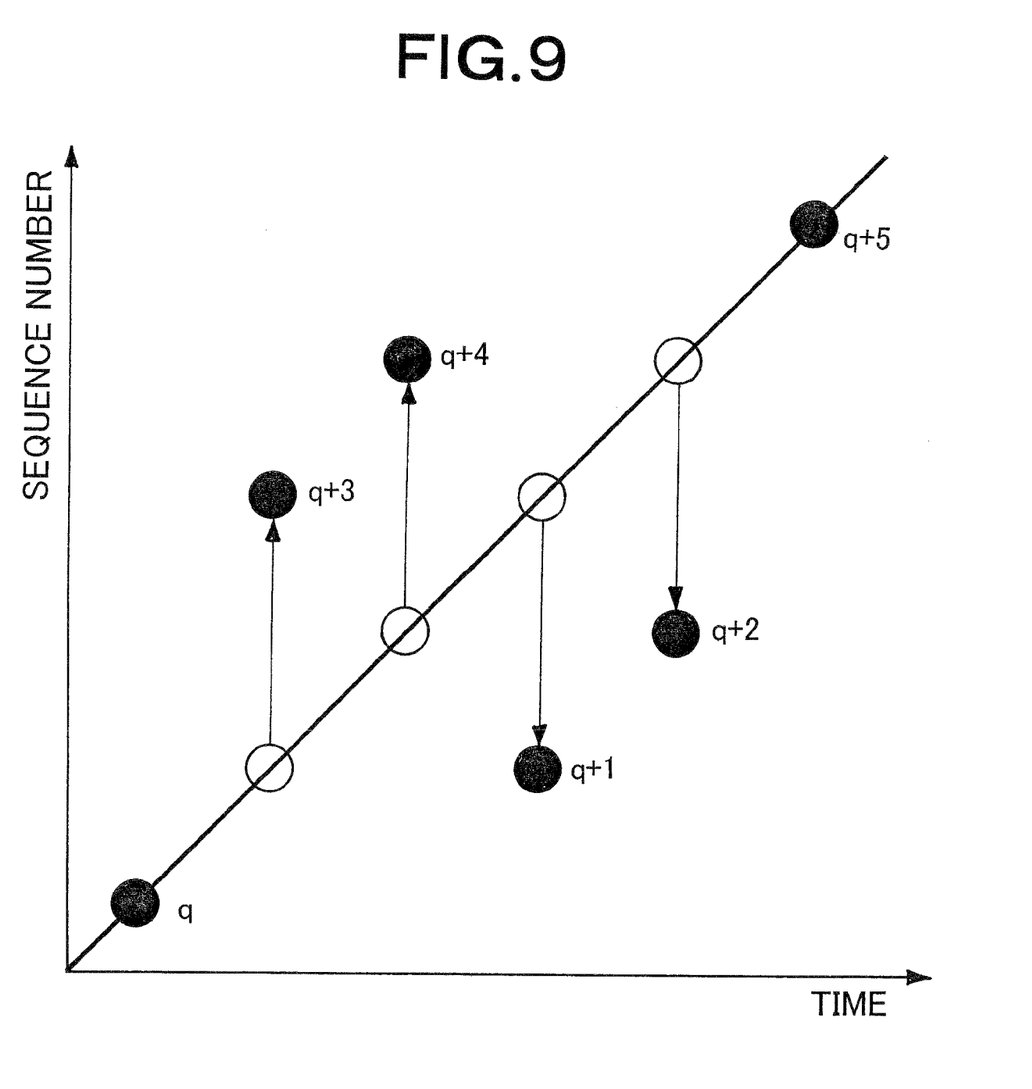
FIG. 9 is a chart showing the relationship between time and sequence number if packets sequentially transmitted from the same transmitter arrives at a receiver while an order of the packets is changed in the IP network.

FIG. 9 shows the relationship between time and sequence number if RTP packets sequentially transmitted from the same transmitter arrives at a receiver while the order of the packets is changed in the IP network 103.

Even in the case shown in FIG. 9, the relationship between the sequence number and the time stamp represented by the linear expression is not destroyed but maintained as shown in FIG. 10. Accordingly, even if RTP packets the sequence numbers of which are not continuous are received, it is determined whether the sequence numbers and the time stamps described in the header of the respective RTP packets satisfy the linear expression representing the relationship between the sequence number and the time stamp for a current stream. If it is determined that the sequence numbers and the time stamps satisfy the relationship represented by the linear expression, the RTP packets are written to the entries at addresses according to the sequence numbers of the respective RTP packets in the buffer used for the current stream. As a result, by reading the RTP packets in order of addresses, it is possible to recover the continuity of sequence numbers.

Supposing that it is determined that the currently received RTP packet, the sequence number of which is not continuous to the previously received RTP packet, belongs to a stream transmitted from the other transmitter based only on the discontinuity of sequence numbers, and that the currently received RTP packet is written to the other buffer based on the determination, then a malfunction occurs.

Therefore, it is significant to confirm the correspondence between the sequence number and the time stamp when sequence numbers are discontinuous so as to prevent such a malfunction.

Figure 11:
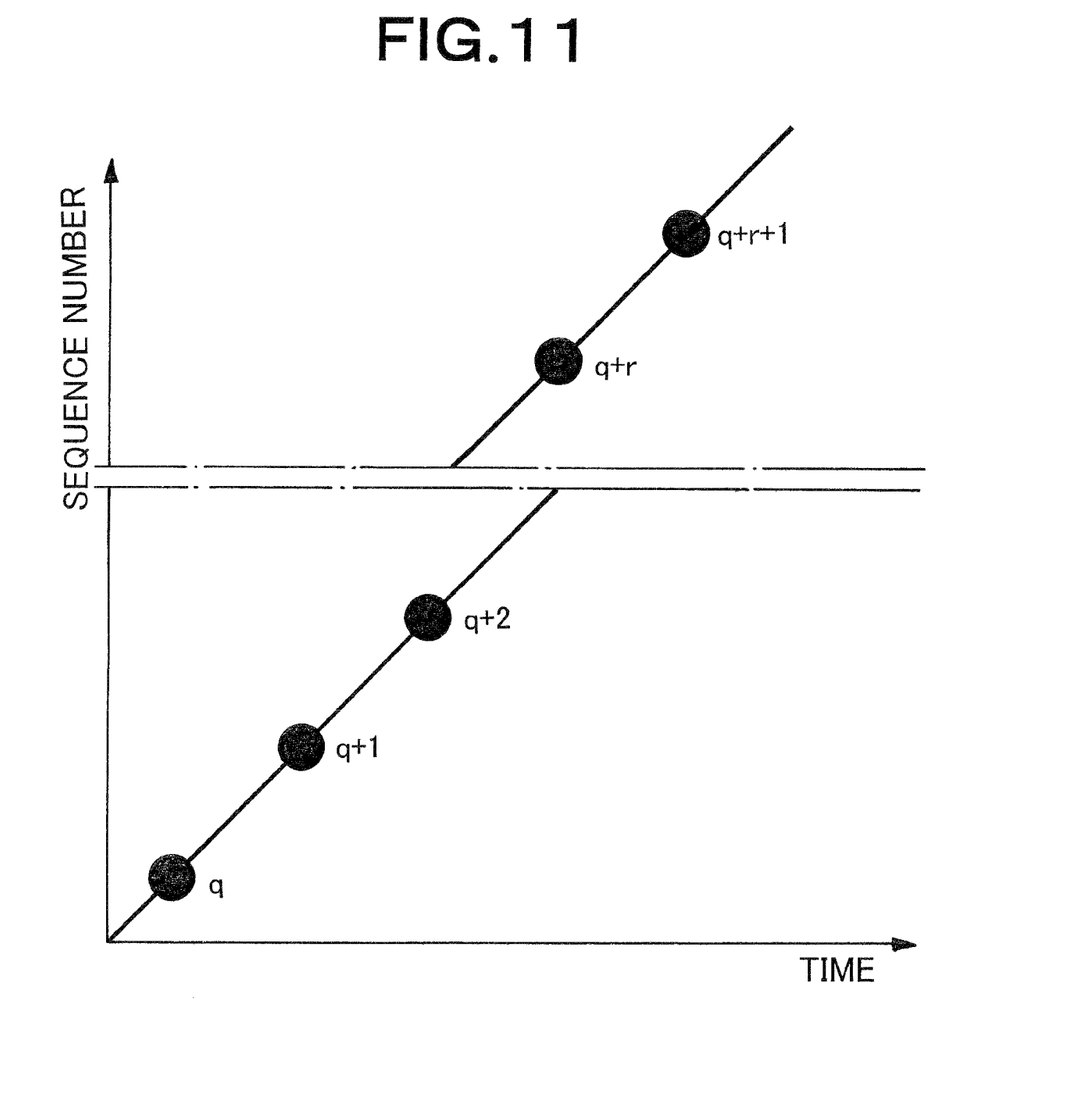
FIG. 11 is a chart showing an example of the relationship between time and sequence number if a transmitter transmitting packets is changed over to another transmitter and sequence numbers of packets arriving at the receiver become discontinuous on the same channel.

FIG. 11 shows an example of the relationship between time and sequence number if a transmitter transmitting RTP packets on the same channel is changed over to another transmitter and the sequence numbers of the RTP packets arriving at the receiver are discontinuous.

Figure 12:
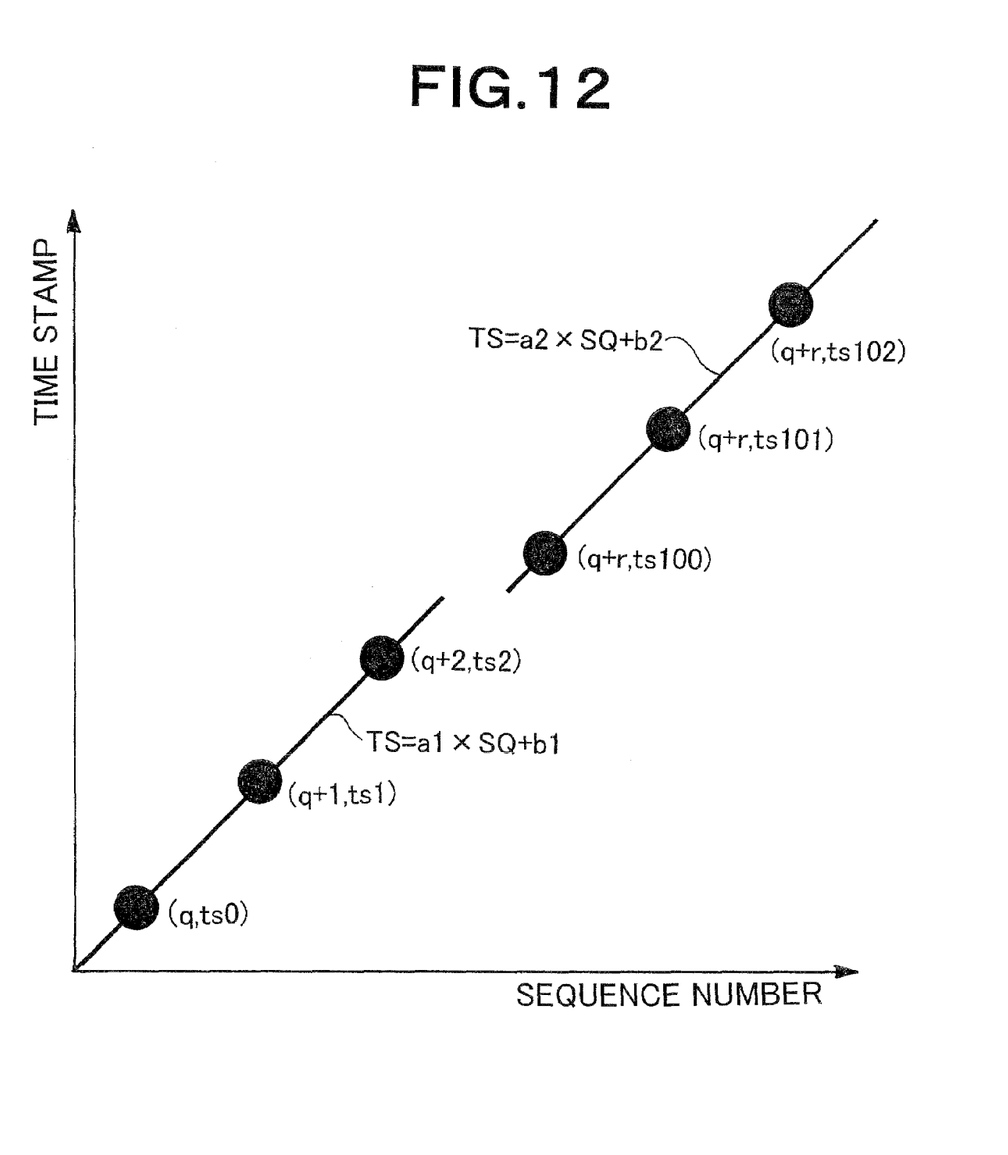
FIG. 12 is a chart showing the relationship between sequence number and time stamp in case of FIG. 11.

In the case of FIG. 11, the relationship between the sequence number and the time stamp represented by the linear expression generally differs between before the changeover and after the changeover as shown in FIG. 12. Accordingly, if the RTP packet, the sequence number of which is not continuous to that of the previously received RTP packet, is received, it is determined whether the sequence number and the time stamp described in the header of the currently received RTP packet satisfies the linear expression between the sequence number and the time stamp for a current stream. If it is determined that they do not satisfy the linear expression, the currently received RTP packet is written to the entry at the leading address in the buffer other than the buffer used for the current stream. By doing so, if one transmitter is changed over to another transmitter, it is possible to prevent the packet just after the changeover from being abandoned.

The embodiment of the present invention has been described while taking the RTP packets as an example. However, the present invention is also applicable to FEC (forward error correction) packets according to RFC2733.

Although the exemplary embodiments of the present invention have been described in detail, it should be understood that various changes, substitutions and alternatives can be made therein without departing from the sprit and scope of the invention as defined by the appended claims. Further, it is the inventor's intent to retain all equivalents of the claimed invention even if the claims are amended during prosecution.

What is claimed is:

1. A received packet processing method comprising:
a packet receiving step of sequentially receiving packets each including a sequence number and a time stamp;
a linear expression calculating step of calculating a linear expression representing a correspondence between the sequence number and the time stamp based on the packets received at the packet receiving step;
a determining step of, if a packet including a sequence number discontinuous to sequence numbers of the previously received packets is received, determining whether or not the currently received packet satisfies the correspondence represented by the linear expression by checking the sequence number and the time stamp of the currently received packet;
a rearranging and outputting step of, if it is determined at the determining step that the currently received packet including the sequence number discontinuous to the sequence numbers of the previously received packets satisfies the correspondence represented by the linear expression, changing an output order of the currently received packet according to the sequence number of the currently received packet; and
a continuously outputting step of, if it is determined at the determining step that the currently received packet including the sequence number discontinuous to the sequence numbers of the previously received packets does not satisfy the correspondence represented by the linear expression, outputting the currently received packet without abandoning the packet.

2. The received packet processing method according to claim 1,
wherein after the continuously outputting step is executed, the packet receiving step and the linear expression calculating step are executed, whereby a new linear expression representing a correspondence between the sequence number and time stamp is obtained, and the determining step is executed based on the correspondence represented by the new linear expression.

3. A received packet processing apparatus comprising:
packet receiving means for sequentially receiving packets each including a sequence number and a time stamp;
linear expression calculating means for calculating a linear expression representing a correspondence between the sequence number and the time stamp based on the packets received by the packet receiving means;
determining means for, if a packet including a sequence number discontinuous to sequence numbers of the previously received packets is received, determining whether or not the currently received packet satisfies the correspondence represented by the linear expression by checking the sequence number and the time stamp of the currently received packet;
rearranging and outputting means for, if the determining means determines that the currently received packet including the sequence number discontinuous to the sequence numbers of the previously received packets satisfies the correspondence represented by the linear expression, changing an output order of the currently received packet according to the sequence number of the currently received packet; and
continuously outputting means for, if the determining means determines that the currently received packet including the sequence number discontinuous to the sequence numbers of the previously received packets does not satisfy the correspondence represented by the linear expression, outputting the currently received packet without abandoning the packet.

4. The received packet processing apparatus according to claim 3,
wherein after the continuously outputting means operates, the packet receiving means and the linear expression calculating means operate, whereby a new linear expression representing a correspondence between the sequence number and time stamp is obtained, and the determining means operates based on the correspondence represented by the new linear expression.

* * * * *